Figure 1:
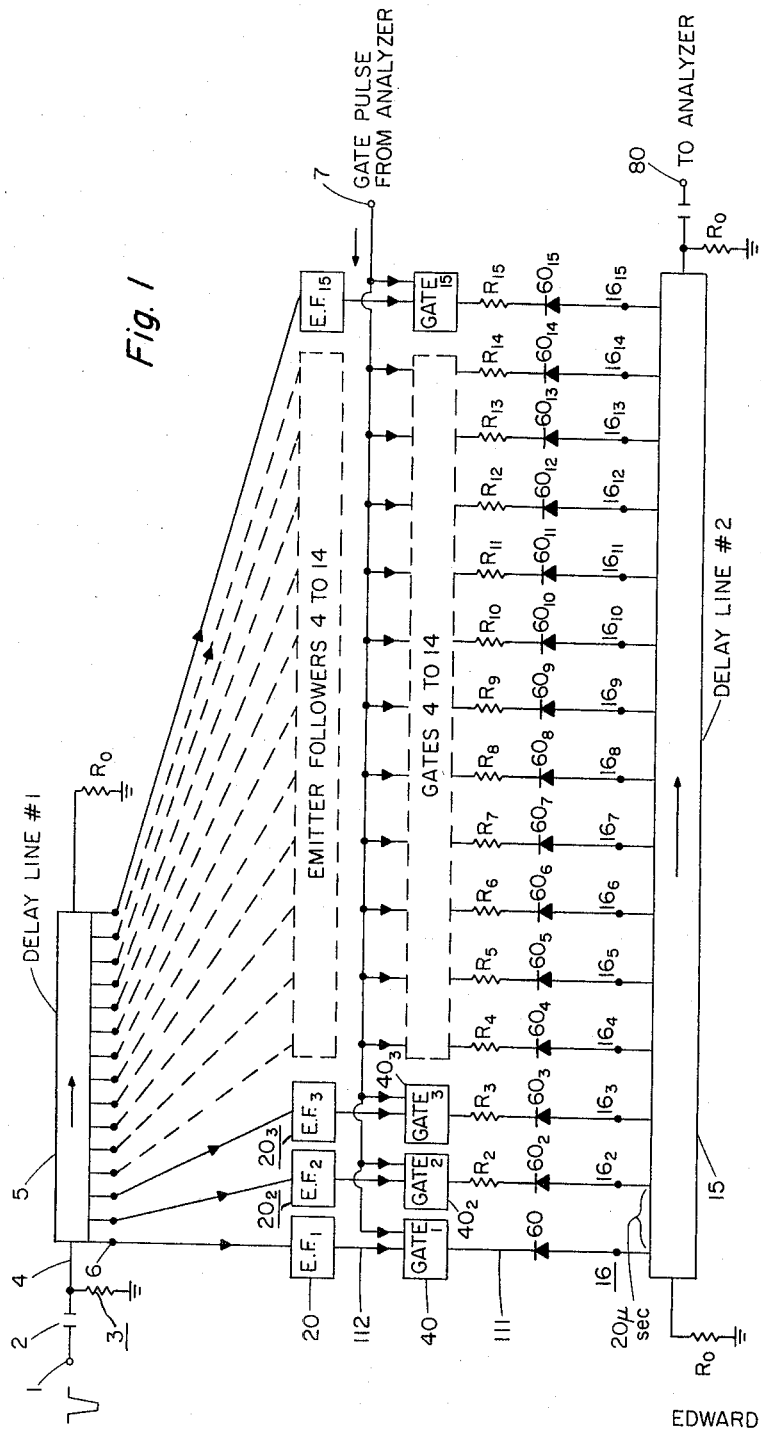

INVENTOR.
EDWARD E. CARROLL JR.

United States Patent Office 3,305,785
Patented Feb. 21, 1967

3,305,785
TIME EXPANDER FOR MULTICHANNEL
ANALYZER
Edward E. Carroll, Jr., Bethel Park, Pa., assignor, by mesne assignments, to the United States of America as represented by the United States Atomic Energy Commission
Filed Oct. 26, 1964, Ser. No. 406,635
1 Claim. (Cl. 328—56)

The invention described herein was made in the course of, or under a contract with the U.S. Atomic Energy Commission.

This invention relates to radiation detection and more particularly to improved electrical apparatus and methods for analyzing very short time nuclear events. In particular, this invention provides a time expander for a multichannel time-distribution analyzer.

There are a large number of situations and especially nuclear processes or events in which it is desired to know the time rate of the process. One method of determining such time rate has been the use of a multichannel analyzer which measures counts per unit of time as a function of time for a very short train of random pulses. Such a device has a plurality of distinct signal channels which are operated in succession for a short time interval so that there is a time distribution of the pulse train in the successive channels. Since the output of each such channel is connected to a scaler a comparison of the counts at the various scalers indicates the time rate of pulses in the pulse train and accordingly indicates the rate of the nuclear events.

Such a system is limited in its application by the fact that the received pulses within any short increment of time must be both counted and stored in a memory device before the pulses within another short increment of time may be counted and stored. Thus the pulses which occur while the apparatus is incapable of receiving them are completely ignored. Such a system is sufficient where the time rate of pulses is substantially constant or the total nuclear event is long but the system is insufficient where the rate of change of the nuclear event is very rapid and the total time period of the nuclear event is very short such that the time required for storing the pulse information might be a substantial fraction of the total nuclear event time period.

Accordingly, it is an object of this invention to provide an improved multichannel time-distribution analyzer.

It is another object to provide improved apparatus and methods for determining the rate of very short nuclear events.

Another object is to provide a time expander for a multichannel analyzer of the time-distribution type.

A further object is to detect and measure the decay of nuclear processes.

A still further object is to detect the rate of change of a process in which there may be substantial variation within a time period of one (1) microsecond.

One aspect of the invention provides for the use of a time expander at the input of a multichannel analyzer of the time-distribution type such that the short time train of successive input pulses is divided into a plurality of equal time-spaced sequential groups of pulses which are superimposed on an expanded or longer time scale, with the groups at equal time-spaced point in the same sequence on that expanded time scale whereby the input to the analyzer is a sequence of time-spaced groups of pulses thereby permitting counting and storing of one group of pulses in one channel during the time period between groups of pulses.

In accordance with another aspect of the invention the time expander includes a short time delay line and a long time delay each having the same number of equally spaced taps and individual gates connected between corresponding taps on the lines so that pulses received in the short line may be transferred as groups into the long line for counting at the analyzer.

In accordance with a still further aspect of the invention the length of the short delay line is of the order of the time period of the nuclear event and the length of the second line is of the order of the product of the short time delay and time distribution period of the analyzer.

In accordance with a still further aspect of the invention a first delay line is provided for receiving a sequential series of pulses. The delay time of this line is substantially equal to the total time of the series of pulses in the sequence, and in radiation decay process measurements this time delay is equal to several times the mean life time of the process. A second delay line is several times longer than the first delay line. Equally spaced taps are connected at spaced points along both delay lines. The output of the second delay line is connected to a multichannel analyzer. Individual gate circuits are connected between the individual taps on one line to the corresponding individual taps on the other line. After the first delay line is filled, all of the gates are open for a time period which is a fraction of the mean life time of the process so that individual groups of pulses are transferred from the first line to the second line at individual taps and the pulse train is expanded.

Figure 2:
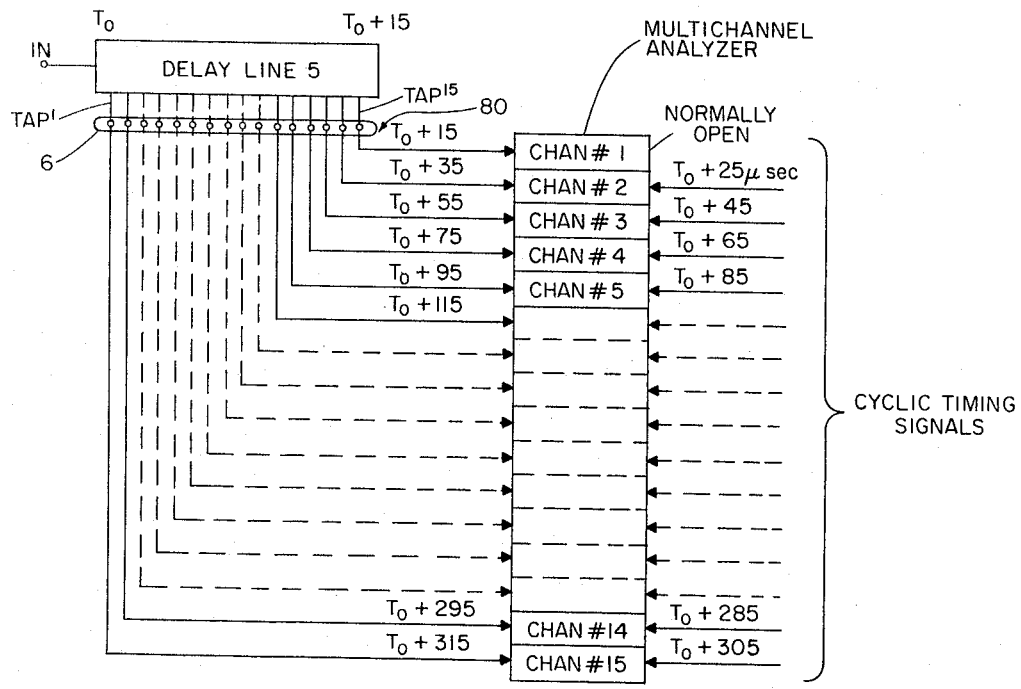
Figure 3:
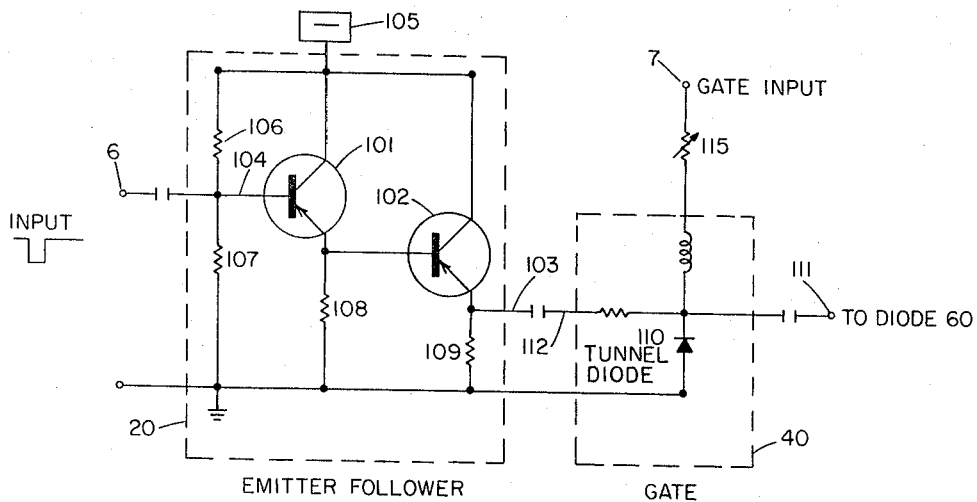

The above-mentioned and other objects will be apparent from the following detailed disclosure in which:

FIG. 1 is a block diagram of the invention.
FIG. 2 is a sketch of time relationships.
FIG. 3 is a schematic diagram of the preferred embodiment of one emitter-follower and gate circuit.

FIG. 1 is a block diagram of the time-expander of this invention and is adapted to receive a train of input pulses at input terminal 1 and provide a time expanded train of pulses at output terminal 80 for connection to a multichannel analyzer of the time-distribution type.

The detection apparatus for producing the train of input pulses is not shown since it does not form part of this invention and since such neutron, gamma, and beta detectors are well known.

The train of pulses may originate from any number or type of nuclear process or event in which the time period of the event is very short and it is desired to measure the time rate of such an event. Examples of such events include the decay of a radio-active isotope to determine its composition or half-life, radiation emission during neutron activation analysis for determining characteristics of known or unknown elements, the thermalization process of fast neutrons and many other processes.

One specific application of this invention is the measurement of the neutron thermalization rate. The rate of thermalization of a fast neutron in the presence of a moderator and absorber is discussed in Nuclear Science and Engineering, volume 15, page 221 (1963). Such fast neutrons may be thermalized by a moderator within a time period of from less than (1) to fifteen (15) microseconds dependent upon chance, the moderating material, the amount of absorbing material, and the capture cross-section of the absorber, as is well known. The average time for thermalization of a particular neutron is referred to as its mean life time. The description of FIG. 1 of this invention is based upon a neutron thermalization process having a mean life time of three microseconds and a maximum life time of fifteen (15) microseconds.

In such a thermalization process a large number of these neutrons are immediately thermalized within the first three microseconds. Subsequently other neutrons are thermalized until after fifteen (15) microseconds all of the fast neutrons have either been thermalized or absorbed. In such an example it is the function of the apparatus of FIG. 1 to determine the time rate of thermalization within this fifteen (15) microsecond time period. Accordingly, a thermal neutron detector (not shown) is used to detect such thermal neutrons and will supply a 15 microsecond train of electrical pulses to input terminal 1.

Input terminal 1 therefore will receive a sequential time series of random pulses during a fifteen (15) microsecond time period. Many of these pulses will arrive during the first few microseconds and then subsequently the rate of such pulses may increase or decrease dependent upon the process. The width of the individual pulses is of the order of several nanoseconds ($10^{-9}$ seconds).

Negative pulses at input terminal 1 are differentiated in the series circuit including capacitor 2 and resistor 3. The differentiated pulses on line 4 pass down an inductive first delay line 5 which is terminated in its characteristic impedance $R_0$.

The length of line 5 is equal to $N\Delta t_1$ where $N=15$, $$\Delta t_1 = \frac{\tau}{3} = 1 \ \mu sec.$$

where $\tau$=mean life time=3 $\mu$ seconds. Output taps 6 are connected at N equally spaced points along the line. Thus each tap is spaced at 1 microsecond intervals along the line.

A second inductive delay line 15 has a time delay which is twenty times larger than the delay line 1—namely 300 microseconds. This line also has N taps 16 where $N=15$. The time delay between adjacent taps on line 20 is twenty microseconds.

The circuit of FIG. 1 also includes 15 emiter-followers 20 and 15 gates 40 and 15 diodes 60.

The first output tap 6 on line 5 is connected to the corresponding first input tap on line 15 by emitter follower 20, line 112, gate 40, line 111 and diode 60; the second tap on line 5 is connected to the second tap on line 15 by emitter follower $20_2$, gate $40_2$, resistor $R_2$ and diode $60_2$. Similarly succeeding taps on line 5 are connected to succeeding corresponding taps on line 15 by succeeding emitter followers $20_3-20_{14}$, gates $40_3-40_{14}$ and diodes $60_3-60_{14}$ until the last taps on lines 5 and 15 are connected by emitter-follower $20_{15}$, gate $40_{15}$, diode $60_{15}$ and resistor $R_{15}$. Resistors $R_2-R_{15}$ are adjusted to compensate for any attenuation of the signal in line 15. Thus $R_2$ is less than $R_3$ and any $R_{N-1}$ is less than $R_N$ while no resistor is present in the output of the first gate circuit. The remaining emiter-follower and gate circuits are shown in dotted lines for connection between taps 4–14 on lines 5 and 15.

A common control line 7 is connected to all of the gate circuits. Normally all of the gates are closed. Both ends of line 15 are terminated in the characteristic impedance of the line while the output end of line 15 at 80 connects to the input of a multi-channel analyzer of the time-distribution type.

The operation of the device is explained with references to FIGS. 1 and 2 and is as follows: At time $T_0$ (zero time) the operation begins. In the preferred application for measuring thermalization of neutrons, a moderator and absorber medium such as in a nuclear reactor may be irradiated with a beam of fast neutrons such as by operating a shutter or other means. A neutron detector detects the thermal neutrons and transmits this train of random pulses to input terminal 1. For other applications such as measuring decay of a radioistotope time $T_0$ may merely be the time when detection measurements are begun.

With reference to both FIGS. 1 and 2, it is understood that multichannel time distribution analyzer of FIG. 2 has a ring counter or other cyclic timing circuit which produces pulses periodically every 20 microseconds to gate open successive ones of the normally closed (except for chann. 1) analyzing channels in the analyzer; accordingly input pulses to the analyzer which are received during successive time periods are distributed to successive channels for counting and storing. Such an analyzer is arranged to supply a one (1) microsecond gating pulse on line 7 (FIG. 1) ten microseconds after it opens a new channel; i.e., the gating pulse is generated within the cyclic time period of the analyzer after a particular channel is gated open for receiving input pulses.

At time $T_0=15$ microseconds, delay line 5 will be filled with pulses and at this time the one (1) microsecond gating pulse is applied on line 7 to open all fifteen of the gates 40 in FIG. 1. Since one (1) microsecond is also the time delay between any two successive taps 6 on delay line 5, all of the pulses in line 5 are transferred into line 15. For example, the group of pulses on delay line 5 between taps 14 and 15 (the last two) pass through the fifteenth emitter follower $20_{15}$, the fifteenth gate $40_{15}$, resistor $R_{15}$ and diode $60_{15}$ into the corresponding 15th (last) tap on delay line 15. This group of pulses will pass into channel 1 of the analyzer as seen in FIG. 2. Similarly the group of pulses between all of the other adjacent taps on delay line 5 pass into a corresponding tap on delay line 15.

It may be stated that the group of pulses between any taps N and $N+1$ on delay line 5 pass into tap $N+1$ on delay line 15, where N is any integer. Effectively the gating circuit has divided a fifteen microsecond train of pulses into fifteen groups of one (1) microsecond trains of pulses and has applied these groups at time spaced points (taps) along a longer delay line.

Thus, at time $T_0+16$ microseconds all of the pulses in line 5 have been transferred into line 15 and the pulses between taps 14 and 15 on delay line 5 are at the output terminal 80 for passage to the multichannel analyzer where they are appropriately recorded in channel 1 of the analyzer. Subsequently other groups of pulses will arrive at 80 and successive groups will be recorded in successive channels of the analyzer.

At time $T_0+25$ microseconds the timing circuit in the multichannel analyzer switches to open a second analyzing channel as shown in FIG. 2. At time $T_0+35$ microseconds the group of pulses which were between taps 13 and 14 on delay line 5 and which had been gated into tap 14 on delay line 15 arrive at output terminal 80 and are appropriately counted and recorded in this second analyzing channel as shown in FIG. 2.

Similarly at successive times, $T_0+45$, $T_0+65$ . . . $T_0+305$, 36 seconds the multichannel analyzer is switched to open further successive channels 3 to 15; at times, $T_0+55$, $T_0+75$ . . . $T_0+315$ successive groups of pulses arrive at output terminal 80 from successive taps on lines 15 which originated from line 5 and are recorded in such further successive analyzing channels as shown in the diagrammatic sketch of FIG. 2.

The result of the above described circuitry is that fifteen successive small time portions (one microsecond) of very short time nuclear events (less than 20 microseconds) may be analyzed continuously by dividing the train of pulses representing the nuclear event into time spaced groups of pulses in which the spacing between the groups on delay line 5 is equal to the switching time between channels, namely 20 microseconds in this example. In particular, the length of delay line 5 is made as long in time as the length of the pulse train representing the nuclear events desired to be analyzed. The event or train of pulses is then broken up in smaller time segments by the use of equally spaced taps on a delay line. The pulses in the delay line 5 are gated into another longer delay line 15 by a pulse whose width is exactly equal to the time delay between adjacent taps on the delay line 5 so that all of the pulses between adjacent taps are transferred as a group of pulses. An important advantage of this system is that a single gate pulse is used to operate all of the gates and only a single analyzer is required.

These advantages will be appreciated when it is considered that it is very difficult to generate a plurality of one microsecond pulses having equal width and amplitude or to build analyzers having identical characteristics.

The result of transfer of the pulses from the short delay line to the long delay line is that the effective length or mean life time of the nuclear event has been expanded in direct proportion to the ratio of the lengths of the delay lines. Furthermore, since the actual pulse information within the second delay line occurs in very small one (1) microsecond "clumps" spaced 20 microseconds apart, the analyzer has plenty of time to store one "clump" of information before it has to store another succeeding "clump" or group of pulses. The length of the second line is the product of the length of the first line and the cyclic time period of the analyzer which in this example is 300 microseconds.

It should be noted that while we have shown a plurality of channels in the analyzer, one advantage of this invention is that only a single channel is necessary. This can be accomplished by feeding all of input pulse groups into the single channel and by connecting the cyclic switching signals to switch the successive output of this single channel into successive storage circuits. For example, the first group of pulses would be counted for 1 microsecond in channel and then stored when the switching pulse occurs. Pulses in group 2 would also be counted in channel 1 and then stored in a second storage circuit when the second switching pulse occurs. Similarly other successive groups can be counted in the same channel and stored in separate storage circuit upon the occurrence of successive switching pulses.

FIG. 3 shows the preferred form of one emitter follower and gate circuit for coupling one output tap on delay line 5 to a corresponding input tap on delay line 15. An emitter follower is preferred because it provides a high input impedance and therefore does not load-down the delay line 5. It is to be understood that there are fifteen such circuits as shown in FIG. 1 partially in dotted lines.

Transistors 101 and 102 are connected in an emitter-follower circuit with the emitter of 101 connected to the base of 102 and with the output taken on line 103 from the emitter of 102. The input circuit 104 at the base of 101 would be connected to a tap 6 on delay line 5.

A negative twelve volt source at 105 is connected for supplying the collectors of emitter followers 101 and 102 and is connected to ground through bias resistors 106 and 107.

The negative output pulses from delay line 5 at tap 6 are applied to the base of transistor 101 causing it to conduct and supply emitter-to-base current in transistor 102 thereby developing a negative output pulse on output line 103 to the input 112 of gate 40.

The gate 40 includes a tunnel diode 110. The tunnel diode is controlled by the negative pulses on line 112 and the negative gate input on line 7. Variable resistor 115 provides pulse amplitude discrimination. When the one microsecond negative gate pulse exists on line 7 and exceeds a threshold value, and a negative pulse also exists on line 103, the tunnel diode conducts to supply a very sharp negative output pulse on terminal 111. As shown in FIG. 1 these negative output pulses from the gate on line 111 pass through diode 60 into a tap on delay line 15. The other fourteen emitter followers and gate act similarly.

Having thus described a preferred embodiment of my invention, it will be obvious that my invention has applications in many fields other than described here. Essentially it has application where time expansion is required for a series of pulses which occur in a very short time period. Accordingly, my invention is defined in the following claim.

I claim:

Apparatus for expanding the time scale of a multichannel time distribution analyzer for the measurement of short time period nuclear events comprising an input terminal for receiving successive random input pulses in a continuous series of short time intervals, a series circuit including a capacitor and a resistor for differentiating the pulses, a first delay line connected to said input terminal, the length of said delay line being substantially equal to the time period of said event, a plurality of output taps connected to said first delay line, said output taps being connected at successive equally spaced time delay points on said first delay line with the spacing between two adjacent taps being less than the mean life time of said event, a second delay line substantially longer in time than said first line and having an output at one end thereof, said second delay line having a plurality of successive input pulses which causes the transference of said pulse along the line, the number of said output taps being equal to the number of said input taps, means for individually connecting successive output taps to successive corresponding input taps respectively with individual normally closed gates connecting each output tap to its respective input tap, means for concurrently opening all of said gates for a time period equal to the time delay between adjacent taps on said first delay line, a gating pulse being applied when the first delay line is filled with a train of input pulses which causes the transference of said pulse train to the second delay line, and means for connecting the output of the second delay line to recording apparatus, the recording apparatus including a plurality of signal channels and a plurality of storage channels; means for generating a cyclic time period reference pulse and the gating pulse, only one gating pulse being required to enable all of the gates, means for successively switching said storage channels for sequentially receiving the output of said signal channels at the completion of each time period, the time delay period between successive input taps on the second delay line equalling the cyclic time period.

References Cited by the Examiner

UNITED STATES PATENTS

| 2,831,162 | 4/1958 | Gross | 324—68 |
| 3,034,048 | 5/1962 | Rogers | 324—68 |
| 3,078,376 | 2/1963 | Lewin | 307—88.5 |
| 3,209,263 | 9/1965 | Keiper | 328—55 |

ARTHUR GAUSS, *Primary Examiner.*

S. D. MILLER, *Assistant Examiner.*